United States Patent
Lee et al.

(10) Patent No.: US 8,953,019 B2
(45) Date of Patent: Feb. 10, 2015

(54) METHOD AND APPARATUS FOR GENERATING STREAM AND METHOD AND APPARATUS FOR PROCESSING STREAM

(75) Inventors: Jae-jun Lee, Suwon-si (KR); Moon-seok Jang, Seoul (KR); Yong-tae Kim, Seoul (KR); Jae-seung Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 482 days.

(21) Appl. No.: 12/908,349

(22) Filed: Oct. 20, 2010

(65) Prior Publication Data

US 2011/0090314 A1  Apr. 21, 2011

Related U.S. Application Data

(60) Provisional application No. 61/253,155, filed on Oct. 20, 2009.

(51) Int. Cl.
*H04N 13/02* (2006.01)
*H04N 13/00* (2006.01)

(52) U.S. Cl.
CPC ....... *H04N 13/0066* (2013.01); *H04N 13/0059* (2013.01)
USPC .................... 348/46; 348/42; 348/43; 348/51

(58) Field of Classification Search
USPC .................... 348/46, 51; 375/240.01, 240.02; 382/154
IPC ............................................. H04N 13/02,13/00
See application file for complete search history.

(56) References Cited

U.S. PATENT DOCUMENTS

| | | | |
|---|---|---|---|
| 7,933,299 B2 * | 4/2011 | Yoo | 370/542 |
| 2002/0041756 A1 * | 4/2002 | Kato | 386/69 |
| 2004/0120396 A1 * | 6/2004 | Yun et al. | 375/240.01 |
| 2005/0193425 A1 | 9/2005 | Sull et al. | |
| 2007/0008575 A1 | 1/2007 | Yu et al. | |
| 2008/0310449 A1 * | 12/2008 | Cha et al. | 370/474 |
| 2008/0310499 A1 * | 12/2008 | Kim et al. | 375/240.01 |

(Continued)

FOREIGN PATENT DOCUMENTS

| | | |
|---|---|---|
| CN | 1954606 A | 4/2007 |
| EP | 1 751 979 A1 | 2/2007 |

(Continued)

OTHER PUBLICATIONS

International Search Report dated May 31, 2011 from the International Searching Authority in counterpart international application No. PCT/KR2010/007202.

(Continued)

*Primary Examiner* — T. X. L.
*Assistant Examiner* — Long Le
(74) *Attorney, Agent, or Firm* — Sughrue Mion, PLLC

(57) ABSTRACT

Provided are a method and apparatus for generating a stream, and a method and apparatus for processing of the stream. The method of generating the stream includes: generating an elementary stream including three-dimensional (3D) image data providing a 3D image, and 3D detail information for reproducing the 3D image; generating a section including 3D summary information representing that a transport stream to be generated from the elementary stream provides the 3D image; and generating the transport stream with respect to the section and the elementary stream.

25 Claims, 9 Drawing Sheets

(56) References Cited

U.S. PATENT DOCUMENTS

| | | | |
|---|---|---|---|
| 2009/0041339 A1* | 2/2009 | Yamada et al. | 382/154 |
| 2010/0020158 A1* | 1/2010 | Oshima et al. | 348/42 |
| 2010/0271465 A1* | 10/2010 | Lee et al. | 348/51 |
| 2010/0329334 A1* | 12/2010 | Kim et al. | 375/240.12 |

FOREIGN PATENT DOCUMENTS

| | | | |
|---|---|---|---|
| JP | 11-353495 A | 12/1999 | |
| JP | 2003-333624 A | 11/2003 | |
| KR | 10-2005-0111379 A | 11/2005 | |
| KR | 10-2007-0058302 A | 6/2007 | |
| KR | 10-2007-0061227 A | 6/2007 | |
| WO | 2009/099510 A1 | 8/2009 | |

OTHER PUBLICATIONS

ISO/IEC 13818-1, MPEG-2 Systems, IS, Dec. 1, 2000, pp. 1-154.

Communication dated Mar. 5, 2014 issued by the State Intellectual Property Office of the People's Republic of China in counterpart Chinese Patent Application No. 201080047472.2.

Communication dated Nov. 3, 2014, issued by the State Intellectual Property Office of the People's Republic of China in counterpart Chinese Application No. 201180047472.2.

* cited by examiner

FIG. 3

| 3d_descriptor( ) { | No. of bits |
|---|---|
| descriptor_tag (310) | 8 |
| descriptor_length (320) | 8 |
| 3d_mode (330) | 2 |
| 3d_half_picture_type (340) | 2 |
| 3d_hiearchy_type (350) | 4 |
| reserved | 2 |
| 3d_hiearchy_layer_index (360) | 6 |
| reserved | 2 |
| 3d_hiearchy_embeded_index (370) | 6 |
| reserved | 2 |
| 3d_hiearchy_channel (380) | 6 |
| } | |

FIG. 4

| Sequence_3d_extension( ) { | No. of bits |
|---|---|
| extension_start_code_Identifier (410) | 4 |
| 3d_mode (420) | 4 |
| layer_id (430) | 8 |
| if(3d mode=='full') { | |
|   full_picture_type (441) | 3 |
|   picture_mux_enable (442) | 1 |
|   reserved | 4 |
|   if(picture_mux_enable) { | |
|     picture_mux_factor (443) | 3 |
|     marker_bit | 1 |
|     picture_mux_factor (444) | 3 |
|     marker_bit | 1 |
|   } | |
| } | |
| if(3d mode=='half') { | |
|   half_picture_type (451) | 4 |
|   LR_flag (452) | 1 |
|   sampling_order (453) | 2 |
|   reserved | 1 |
| } | |
| if(3d mode=='local') { | |
|   local_layer_prediction_horizontal_size (461) | 16 |
|   local_layer_prediction_vertical_size (462) | 16 |
|   local_layer_prediction_horizontal_offset (463) | 16 |
|   local_layer_prediction_vertical_offset (464) | 16 |
|   local_layer_prediction_horizontal_size (465) | 16 |
|   local_layer_prediction_vertical_size (466) | 16 |
| } | |
| next_start_code( ) (470) | |
| } | |

METHOD AND APPARATUS FOR GENERATING STREAM AND METHOD AND APPARATUS FOR PROCESSING STREAM

CROSS-REFERENCE TO RELATED PATENT APPLICATION

This application claims the benefit of U.S. Provisional Application No. 61/253,155, filed on Oct. 20, 2009 in the U.S. Patent and Trademark Office, the disclosure of which is incorporated herein in its entirety by reference.

BACKGROUND

1. Field

Apparatuses and methods consistent with exemplary embodiments relate to generating a stream and processing of the stream, and more particularly, to generating a stream, and processing of the stream that provides three-dimensional images while maintaining compatibility with existing systems.

2. Description of the Related Art

In a related art, broadcasting systems providing two-dimensional image data are prevalent.

However, as a demand of viewers for three-dimensional (3D) images increases, 3D broadcasting services are being provided.

In order to provide the 3D broadcasting services, information indicating that a 3D image is provided, and information used for processing of 3D image data are to be signaled. Meanwhile, compatibility with related art two-dimensional broadcasting services is to be maintained.

SUMMARY

According to an aspect of an exemplary embodiment, there is provided a method of generating a stream, the method including: generating an elementary stream including 3D image data providing a 3D image, and 3D detail information used to reproduce the 3D image data; generating a section including 3D summary information representing that a transport stream to be generated from the elementary stream provides the 3D image; and generating the transport stream with respect to the section and the elementary stream.

The 3D detail information may be included in a certain field of at least one of a sequence layer, a GOP layer, and a picture layer in the elementary stream.

The 3D detail information may include at least one of 3D mode information representing a configuration of the 3D image data and viewpoint information representing a viewpoint of the 3D image data.

The 3D detail information may further include output order information representing an output order between additional viewpoint image data and reference viewpoint image data providing the 3D image.

The 3D detail information may further include at least one of sampling information and synthesis mode information between additional viewpoint image data and reference viewpoint image data providing the 3D image.

The 3D detail information may further include 3D section information on a section where the 3D image is provided in an image sequence.

The generating the section may include inserting the 3D summary information into information on a plurality of image data of different layers provided through the elementary stream.

The plurality of image data of different layers may be encoded by at least one of a scalability video coding (SVC) codec and a multi-view video coding (MVC) codec.

The 3D summary information may further include 3D mode information on a configuration of the 3D image data.

The section may include a program mapping table.

According to an aspect of another exemplary embodiment, there is provided a method of processing a packet, the method including: restoring a section including summary information on 3D image data from a first transport stream; restoring an elementary stream providing the 3D image data from a second transport stream, based on the summary information; acquiring 3D detail information used to reproduce a 3D image from a region of the elementary stream providing the 3D image data; and decoding the elementary stream, based on the 3D detail information.

According to an aspect of another exemplary embodiment, there is provided an apparatus for generating a stream, the apparatus including: an elementary stream generation unit which generates an elementary stream including 3D image data providing a 3D image, and 3D detail information used to reproduce the 3D image; a section generation unit which generates a section including 3D summary information representing that a transport stream to be generated from the elementary stream provides the 3D image; and a transport stream generation unit which generates the transport stream with respect to the section and the elementary stream.

According to an aspect of another exemplary embodiment, there is provided an apparatus for processing a packet, the apparatus including: a section restoring unit which restores a section including summary information on 3D image data from a first transport stream; an elementary stream restoring unit which restores an elementary stream providing the 3D image data from a second transport stream, based on the summary information; a detail information acquisition unit which acquires 3D detail information used to reproduce a 3D image from a region of the elementary stream providing the 3D image data; and decoding unit which decodes the elementary stream, based on the 3D detail information.

According to an aspect of another exemplary embodiment, there is provided a method of processing a packet, the method including: restoring a section comprising 3D summary information on 3D image data from a first transport stream; restoring an elementary stream providing the 3D image data from a second transport stream, based on the 3D summary information; and decoding the restored elementary stream.

BRIEF DESCRIPTION OF THE DRAWINGS

The above and/or other aspects will become more apparent by describing in detail exemplary embodiments with reference to the attached drawings in which:

FIG. 3 is a diagram illustrating exemplary three-dimensional summary information 300 according to an exemplary embodiment;

FIG. 4 is a diagram illustrating exemplary three-dimensional detail information according to an exemplary embodiment;

DETAILED DESCRIPTION OF EXEMPLARY EMBODIMENTS

Hereinafter, exemplary embodiments will be described in detail with reference to the accompanying drawings. It is understood that expressions such as "at least one of," when preceding a list of elements, modify the entire list of elements and do not modify the individual elements of the list.

Figure 1:
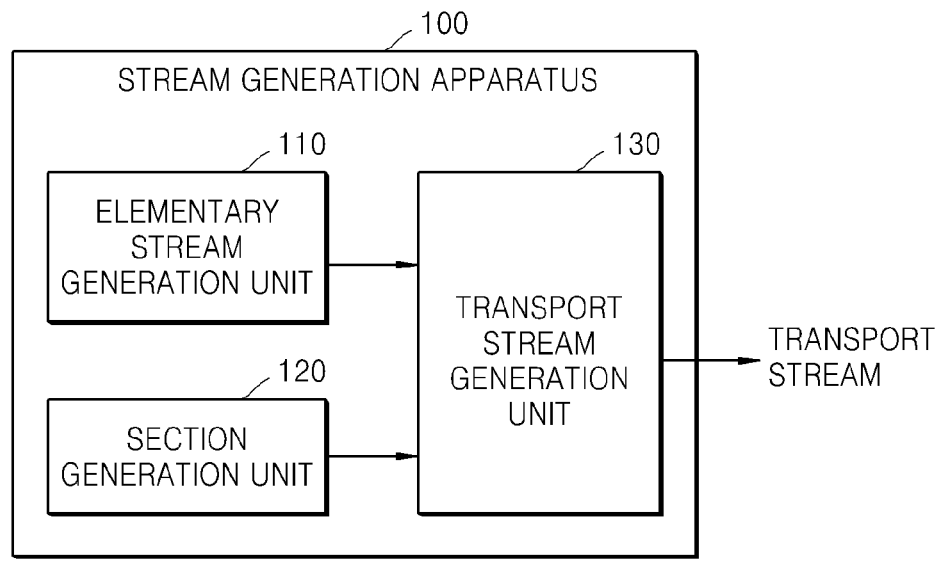
FIG. 1 is a block diagram illustrating a stream generation apparatus 100 according to an exemplary embodiment.

FIG. 1 is a block diagram illustrating a stream generation apparatus 100 according to an exemplary embodiment.

Referring to FIG. 1, the stream generation apparatus 100 may include an elementary stream generation unit 110, a section generation unit 120, and a transport stream generation unit 130.

The elementary stream generation unit 110 may generate an elementary stream including three-dimensional (3D) image data and 3D detail information. In the present exemplary embodiment, the 3D image data may be image data providing 3D images, and the 3D detail information may be information used in reproducing of the 3D images using the 3D image data (e.g., information used for decoding).

The 3D detail information may include 3D mode information representing a configuration of the 3D image data. In order to provide 3D images, a plurality of image data of different viewpoints may be used. In an exemplary embodiment, left-viewpoint image data and right-viewpoint image data are to be sequentially exposed to a left eye and a right eye to provide a stereoscopic image. The 3D mode information corresponds to how the left-viewpoint image data and the right-viewpoint image data are configured. For example, the 3D mode information may include at least one of whether the left-viewpoint image data and the right-viewpoint image data are included in separate pictures, whether the left-viewpoint image data and the right-viewpoint image data are synthesized to be included in one picture, whether information (e.g., depth information and disparity) used to restore the right-viewpoint image data is provided instead of the right-viewpoint image data, whether information used to restore the left-viewpoint image data is provided instead of the left-viewpoint image data, etc.

Moreover, various information used to provide 3D images may be included in the 3D detail information. A detailed description of the 3D detail information according to an exemplary embodiment will be provided below with reference to FIG. 5.

The section generation unit 120 may generate a section in which 3D summary information is included.

In digital broadcasting, one or more elementary streams may be multiplexed to be delivered through various transmission media and networks. One or more elementary streams may correspond to one service, and one or more services may be combined in one transport stream. The transport stream formed by such a method may be transmitted through various physical media.

A broadcasting receiver may selectively retrieve and receive a transport stream desired by a viewer from among a plurality of transport streams. The broadcasting receiver may be configured to determine information on contents and types of individual programs that are provided by respective services. Accordingly, a broadcasting sender may transmit separate information in addition to transport streams for service. The separate information may be referred to as service information or program guide information. For example, Digital Video Broadcasting (DVB) of Europe and Advanced Television Systems Committee (ATSC) of America are digital broadcasting system standards that provide the service information or the program guide information.

The section may be one of a data format that can be transmitted through the transport stream, and may include service-related information such as the service information and the program guide information. The service-related information may be configured with at least one section. Examples of service-related information configurable with sections may include Program Specific Information (PSI) such as a Program Association Table (PAT) and a Program Map Table (PMT), and System Information (SI) such as an Event Information Table (EIT).

PSI may be used when a transport stream (TS) is demuxed to data regulated in an MPEG-2 system. SI may be defined as different names, e.g., System Information (SI) in DVB that is a European terrestrial standard, and Program and System Information Protocol (PSIP) in American ATSC, but may have a similar operation of providing a service such as EPG.

The section generation unit 120 may generate the above-described section by inserting the 3D summary information. The 3D summary information may include information indicating that a transport stream to be generated in the transport stream generation unit 130 described below provides a 3D image.

Methods of indicating whether a transport stream provides a 3D image using 3D summary information may vary. For example, in an exemplary embodiment, the section generation unit 120 may allocate a packet identifier (PID) of a transport stream providing a 3D image to an unused value (e.g., a reserved value), and may discard the transport stream including the corresponding PID in a two-dimensional (2D) image receiver (i.e., process only transport streams having other PID values) and process the transport stream including the corresponding PID in a 3D image receiver to provide a 3D image.

The 3D summary information may further include viewpoint information representing viewpoints (e.g., reference viewpoint and additional viewpoint) when a transport stream is provided. In addition, the 3D summary information may include any information used to provide a 3D image in a broadcasting receiver.

The 3D summary information may be inserted into any section. In an exemplary embodiment, the 3D summary information may be inserted into a PMT. When a base stream coded by Scalability Video Coding (SVC) or Multi-view Video Coding (MVC) includes image data of different layers, the PMT may include information on image data for each layer. The section generation unit 120 may substitute information on the image data for each layer with 3D summary information. In this case, information that cannot be inserted into the information on the image data for each layer may be newly defined in a reserved region. In another exemplary embodiment, the section generation unit 120 may newly define 3D_descriptor( ) providing the 3D summary information, and may use the same or similar structure as the structure of information on the image data for each layer. Thus, compatibility with a related art system may be maintained by providing the 3D information without considerably modifying the PMT.

A detailed description of 3D summary information according to an exemplary embodiment will be provided below with reference to FIG. 3.

The transport stream generation unit 130 may generate a transport stream with respect to an elementary stream providing at least one section and a 3D image. For convenience of explanation, a transport stream with respect to a section is referred to as a first stream, and a transport stream with respect to the elementary stream providing the 3D image is referred to as a second stream.

An exemplary process of generating a transport stream by the transport stream generation unit 130 is as follows:

i) At least one packetized elementary stream (PES) may be generated by packetizing the elementary stream generated by the elementary stream generation unit 110. The packetized elementary stream may be divided into a packetized elementary stream header region and a packetized elementary stream payload region, and at least a portion of the elementary stream may be stored in the packetized elementary stream payload region.

ii) At least one TS packet may be generated with respect to at least one section generated by the section generation unit 120 and the PES generated in the operation i). The TS packet may be a packet having a fixed length, and may start at a transport stream header region of 4 bytes. Data of the PES or the section may be inserted into the payload region after the transport stream packet header region.

iii) The TS packet generated in the operation ii) may be multiplexed to generate the transport stream. The transport stream may be a continuity of at least one packetized stream packet.

The 3D image data stream generation apparatus 100 may further include a transport unit (not shown) transmitting the generated transport stream. Also, the 3D image data stream generation apparatus 100 may further include a storage unit (not shown) that stores the transport stream in a storage medium.

Figure 2:
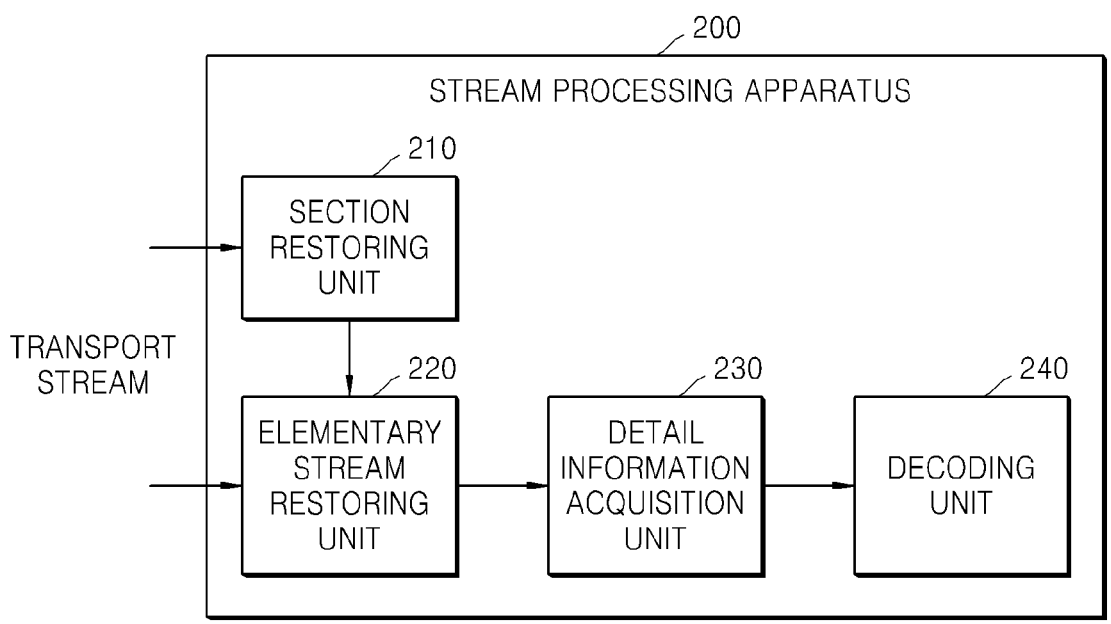
FIG. 2 is a block diagram illustrating a transport stream processing apparatus 200 according to an exemplary embodiment.

FIG. 2 is a block diagram illustrating a transport stream processing apparatus 200 according to an exemplary embodiment.

Referring to FIG. 2, the transport stream processing apparatus 200 may include a section restoration unit 210, an elementary stream restoration unit 220, a detail information acquisition unit 230, and a decoding unit 240.

The section restoration unit 210 may restore a section by processing a first transport stream including the section. Summary information on 3D image data may be included in at least one restored section. The section restoration unit 210 may restore the section by performing a process opposite to that of the transport stream generation unit 130 of FIG. 1.

Specifically, the section restoration unit 210 may restore the section by performing the following exemplary process:

i) the first transport stream may be demultiplexed to separate at least one transport stream packet. The transport stream may be separated into transport stream packets having a fixed length.

ii) The at least one transport stream packet acquired in the operation i) may be depacketized to restore at least one section.

The 3D summary information may include whether a transport stream providing a 3D image exists, and identification information on the transport stream providing the 3D image. Specifically, the 3D summary information may include an index value or a PID of the transport stream providing the 3D image. In this case, a PID of a transport stream including image data of reference viewpoint and a PID of a transport stream including image data of additional viewpoint may be separately assigned.

The elementary stream restoration unit 220 may restore an elementary stream providing 3D image data from the second transport stream based on the 3D summary information. The elementary stream restoration unit 220 may restore the elementary stream including the 3D image data by performing a process opposite to that of the transport stream generation unit 130 of FIG. 1.

Specifically, the elementary stream restoration unit 220 may restore the elementary stream including the 3D image data by performing the following exemplary process:

i) At least one transport stream packet may be separated by demultiplexing the second transport stream. The transport stream may be separated into transport stream packets having a fixed length.

ii) At least one transport stream packet may be depacketized to restore at least one packetized elementary stream.

A PID, which is identification information representing the type of data in which the transport stream packet is transmitted, may be stored in the transport stream packet header region. Since a PID for each program may be included in a PMT, the elementary stream restoration unit 220 may access the transport stream packet in which the 3D image data is included by acquiring the PID of the transport stream packet that is transmitted through the second transport stream via the PMT.

iii) At least one packetized elementary stream that has been restored in the operation ii) may be depacketized to restore the elementary stream including the 3D image data.

The detail information acquisition unit 230 may acquire 3D detail information used for reproduction of the 3D image from a certain region in the elementary stream providing the 3D image data. The detail information acquisition unit 230 may acquire the detail information from a certain field in at least one of a sequence layer, a GOP layer, and a picture layer.

The decoding unit 240 may decode data of the elementary stream to acquire 3D image data. According to the 3D image format, left-viewpoint image data and right-viewpoint image data may be included in separate pictures, or may be included in one picture.

The stream processing apparatus 200 may further include a replay unit (not shown). The replay unit (not shown) may replay the 3D image using the decoded 3D image data. According to an exemplary embodiment, a portion of an image sequence may be configured with the 3D image, and another portion of image sequence may be configured with a 2D image.

The stream generation apparatus 100 and the stream processing apparatus 200 according to one or more exemplary embodiments may define a new description, and provide 3D summary information through the newly defined description or insert the 3D summary information into an existing description. In an exemplary embodiment, "hierarchy descriptor" may be information on a plurality of associated image data, and the 3D summary information may be provided through the hierarchy descriptor. Thus, a 3D image can be provided compatibility with a related art 2D image system and can be maintained by providing the 3D summary information without significantly modifying a related art data structure.

The stream generation apparatus 100 and the stream processing apparatus 200 may insert the 3D detail information into a certain region in an elementary stream level. Accordingly, it is not necessary to define a new description in the transport stream packet, and the compatibility with a related art system can be maintained.

FIG. 3 is a diagram illustrating exemplary 3D summary information 300 according to an exemplary embodiment. The 3D summary information 300 is a newly defined description, but may have a same structure as a relater art hierarchy descriptor except with respect to one or more fields. Accordingly, compatibility with a related art system can be maintained.

Referring to FIG. 3, a descriptor_tag field 310 denotes a type of description.

A descriptor_length field 320 denotes a length of description.

A 3d_mode field 330 denotes a structure of 3D image data.

The following Table 1 shows an exemplary structure of the 3D image data according to the value of the 3d_mode field 330:

TABLE 1

| 3d_mode (330) | Structure |
| --- | --- |
| 00 | Full picture |
| 01 | Half picture |
| 10 | Local picture |
| 11 | Reserved |

In Table 1, if the value of the 3d_mode field is 00, the 3D image data may be of a full picture type. In the full picture type, left-viewpoint image data and right-viewpoint image data may be included in separate pictures.

When the value of the 3d_mode field 330 is 01, the 3D image data may be of a half picture type. In the half picture type, the left-viewpoint image data and the right-viewpoint image data may be synthesized in one picture.

When the value of the 3d_mode is 10, the 3D image data may be of a local picture type. In the local picture type, a 3D image may be replayed in only a portion of an image sequence (time or space), and a 2D image may be replayed in another portion of the image sequence. The 3D image data to be replayed in a portion of the image sequence may be transmitted in a form of additional information or may be included in a picture.

A 3d_half_picture_type 340 denotes a synthesis method by which the left-viewpoint image data and the right-viewpoint image data are synthesized in one picture.

The following Table 2 shows an exemplary synthesis method of the left-viewpoint image data and the right-viewpoint image data according to the value of the 3d_half_picture_type field 340:

TABLE 2

| 3d_half_picture_type (340) | Type |
| --- | --- |
| 0000 | Side by side |
| 0001 | Top and bottom |
| 0010 | Vertical line interleaved |
| 0011 | Horizontal line interleaved |
| 0100 | Checker board format |
| Other | Reserved |

In Table 2, a side by side type denotes a form in which left-viewpoint image data and right-viewpoint image data corresponding to a left-side region and a right-side region of a synthesis picture are arranged side by side.

A top and bottom type denote a form in which left-viewpoint image data and right-viewpoint image data corresponding to an upper-end region and a lower-end region of the synthesis picture are arranged side by side.

A vertical line interleaved type denotes a form in which left-viewpoint image data and right-viewpoint image data corresponding to an odd horizontal line and an even horizontal line of the synthesis picture are arranged side by side.

A horizontal line interleaved type denotes a form in which left-viewpoint image data and right-viewpoint image data corresponding to an odd vertical line and an even vertical line of the synthesis picture are arranged side by side.

A checker board type denotes a form in which left-viewpoint image data and right-viewpoint image data corresponding to pixels of the horizontal direction and pixels of the vertical direction are alternately arranged.

A 3d_hierachy_type field 350 denotes a layer relation of a plurality of associated image data from among a spatial layer, a time layer, and a quality layer.

A 3d_hierarchy_layer_index field 360 denotes index values of the plurality of associated image data. When the plurality of associated image data is 3D image data, the 3d_hierarchy_layer_index field 360 may include identification information on a transport stream including multi-viewpoint image data.

A 3d_hierarchy_embeded_layer_index field 370 denotes an index of image data to be decoded together among the associated image data. In an exemplary embodiment, since image data corresponding to a base layer is not used to decode together with other image data, a corresponding field may be vacant. On the other hand, since image data corresponding to an enhancement layer is to be decoded together with image data of a lower layer, the index of the image data to be together decoded may be included in a 3d_hierarchy_channel field 380.

When the plurality of associated image data is 3D image data, the 3d_hierarchy_embeded_layer_index field 370 with respect to reference viewpoint image data may be absent or vacant, and the 3d_hierarchy_embeded_layer_index field 370 with respect to additional viewpoint image data may include an index value with respect to a transport stream including the reference viewpoint image data.

The 3d_hierarchy_channel field 380 denotes a channel related to a broadcasting service included in image data.

A new description including 3D summary information according to an exemplary embodiment has been defined with reference to FIG. 3. However, as described above, related art description summary information such as a hierarchy descriptor may be inserted. In this case, since the 3d_mode field 330 and the 3d_half_picture_type field 340 are defined in the hierarchy descriptor, the 3d_mode field 330 and the 3d_half_picture_type field 340 may be newly defined through a reserved region in the hierarchy descriptor.

FIG. 4 is a diagram illustrating exemplary 3D detail information according to an exemplary embodiment.

Referring to FIG. 4, an extension_start_code_Identifier field 410 denotes a type of information. Since the 3D detail information is a description that is newly defined, the extension_start_code Identifier field 410 may have a value corresponding to "reserved."

A 3D_mode field 420 denotes a structure of the 3D image data. Since the 3D_mode field 420 is identical or similar to the 3D_mode 330 of FIG. 3, a detailed description thereof will be omitted herein.

A layer_id field 430 denotes a layer between the plurality of associated image data. For example, reference viewpoint image data corresponding to a base layer may have a value of 0, and additional viewpoint image data corresponding to an enhancement layer may have a value of 1. While not restricted thereto, the layer_id field 430 may be defined only when the 3D image data according to the 3D_mode field 420 is a full picture, since the associated image data is all included in one picture when the 3D image data according to the 3D_mode field 420 is a half picture.

Also, when the 3D image data is multi-viewpoint image data that is a full picture, the layer_id field 430 of the base layer image data may not have a value of 0. The layer_id field 430 of image data corresponding to the leftmost viewpoint may have a value of 0, and the field value may increase from 0 toward the right viewpoint.

When the type of the image data according to the 3D_mode field is a full picture, fields 441 to 444 may be defined. When the type of the image data is a half picture, fields 451 to 453 may be defined. When the type of the image data is a local picture, fields 461 to 466 may be defined.

A full_picture_type field 441 denotes a form of additional viewpoint image data.

The following Table 3 denotes an exemplary form of the additional viewpoint image data according to the full_picture_type field 441:

TABLE 3

| full_picture (441) | Form |
| --- | --- |
| 00 | Sequential image |
| 01 | Disparity image |
| 10 | Depth image |
| 11 | Multiview image |
| Other | Reserved |

When the full_picture_type field 441 has a value of 00 or 11, the reference viewpoint image data and the additional viewpoint image data may independently exist.

When the full_picture_type field 441 has a value of 01 or 10, only additional information (e.g., disparity information and depth information) for acquiring the additional viewpoint image data may be provided. Accordingly, the stream processing apparatus 200 acquires the additional viewpoint image data using the reference viewpoint image data and the disparity information, or the reference viewpoint image data and the depth information.

A picture_mux_enable field 442 denotes whether information representing a processing order among a plurality of associated image data exists. In order to reproduce the 3D image, the reference viewpoint image (e.g., left viewpoint image) and the additional viewpoint image (e.g., right viewpoint image) may be sequentially replayed in synchronization with each other. In this case, if the processing (e.g., rendering or display) order of the reference viewpoint image and the additional viewpoint image is reversed, a user may not sufficiently perceive a 3D sense. Accordingly, regulating the processing order overcomes this problem.

A picture_mux_order field denotes a processing order between base layer image data (e.g., left viewpoint image data) and enhancement layer image data (e.g., right viewpoint image data). When the picture_mux_order field 443 is 0, the left viewpoint image data may be processed, and then the right viewpoint image data may be processed subsequently. On the other hand, when the picture_mux_order field 443 is 1, the right viewpoint image data may be processed, and the left viewpoint image data may be processed subsequently.

A picture_mux_factor field 444 denotes a number of enhancement layer image data to be processed prior to the base layer image data. If the 3D image is provided using only the left viewpoint image data and right viewpoint image data, the picture_mux_order field 443 is sufficient. However, if the 3D image is provided using image data with respect to three or more different viewpoints, the number of the additional viewpoint image data to be processed prior to the reference viewpoint image data is greater than 1. In this case, the picture_mux_factor field 444 may be used.

A half_picture_type field 451 denotes a synthesis method by which the left-viewpoint image data and the right-viewpoint image data are included in one picture. Since the half_picture_type field 451 is identical or similar to the 3D half_picture_type field 340 of FIG. 3, a detailed description thereof will be omitted herein.

A LR_flag field 452 denotes a disposition relation between the left viewpoint image data and the right viewpoint image data in one picture.

The following Table 4 shows an exemplary disposition relation between the left viewpoint image data and the right viewpoint image data according to the LR_flag field 452:

TABLE 4

|  | LR_flag = 0 | | LR_flag = 1 | |
| --- | --- | --- | --- | --- |
| identification | Left view | Right view | Left view | Right view |
| Side by side | Left view | Right view | Right view | Left view |
| Top and bottom | Upper side | Lower side | Right side | Left side |
| Vertical line interleaved | Odd line | Even line | Even line | Odd line |
| Horizontal line interleaved | Odd line | Even line | Even line | Odd line |
| Frame sequential | Odd frame | Even frame | Even frame | Odd frame |
| Field sequential | Odd field | Even field | Even field | Odd field |
| Checker board | Odd pixel | Even pixel | Even pixel | Odd pixel |

Referring to Table 4, when the value of the LR_flag field 452 is 0, and the synthesis type is a side by side type, the left viewpoint image data may be disposed at the left side of the synthesis image, and the right viewpoint image data may be disposed at the right side of the synthesis image.

Similarly, when the value of the LR_flag field 452 is 0, and the synthesis type is a top and bottom, the left viewpoint image data may be disposed at an upper end of the synthesis image, and the right viewpoint image data may be disposed at a lower end of the synthesis image.

When the value of the LR_flag field 452 is 1, the disposition of the right and left viewpoint image data is opposite to that of the above-described case where the LR_flag field 452 is 0.

A sampling_order field 453 denotes a sampling method used when one picture is generated by synthesizing the left viewpoint image data and the right viewpoint image data. It is assumed in FIG. 4 that a sampling method for selectively extracting one from continuous lines in generating the synthesis image is used, though it is understood that another exemplary embodiment is not limited thereto. For example, according to another exemplary embodiment, a sampling method for the average value of the continuous lines with one line value may also be used.

The following Table 5 shows an exemplary method of synthesizing left viewpoint image data 610 and right viewpoint image data 620 according to the value of the sampling order field 453:

TABLE 5

| sampling_order (453) | Left viewpoint image data | Right viewpoint image data |
| --- | --- | --- |
| 0 | Odd line | Even line |
| 1 | Even line | Odd line |
| 2 | Odd line | Odd line |
| 3 | Even line | Even line |

When the value of the sampling_order field 453 is 0, an odd vertical (or horizontal) line of the left viewpoint image data may be sampled, and an even vertical (or horizontal) line of the right viewpoint image data may be sampled. Similarly, when the value of the sampling_order field 453 is 3, an even vertical (or horizontal) line of the left viewpoint image data may be sampled, and an even vertical (or horizontal) line of the right viewpoint image data may be sampled.

The following Table 6 shows an exemplary sampling form of the left viewpoint image data and the right viewpoint image data when the value of the sample_order field 453 is 0:

TABLE 6

| Synthesis form | Left viewpoint image data | Right viewpoint image data |
| --- | --- | --- |
| Side by side | Odd vertical line | Even vertical line |
| Top and bottom | Odd horizontal line | Even horizontal line |
| Vertical line interleaved | Odd vertical line | Even vertical line |
| Horizontal line interleaved | Odd horizontal line | Even horizontal line |
| Other | Odd line | Even line |

In Table 6, when the value of the sampling_order field 453 is 0, and the synthesis form of the left viewpoint image data and the right viewpoint image data is a side by side form, an odd vertical line of the left viewpoint image data may be sampled, and an odd vertical line of the right viewpoint image data may be sampled to generate new image data.

Figure 6:
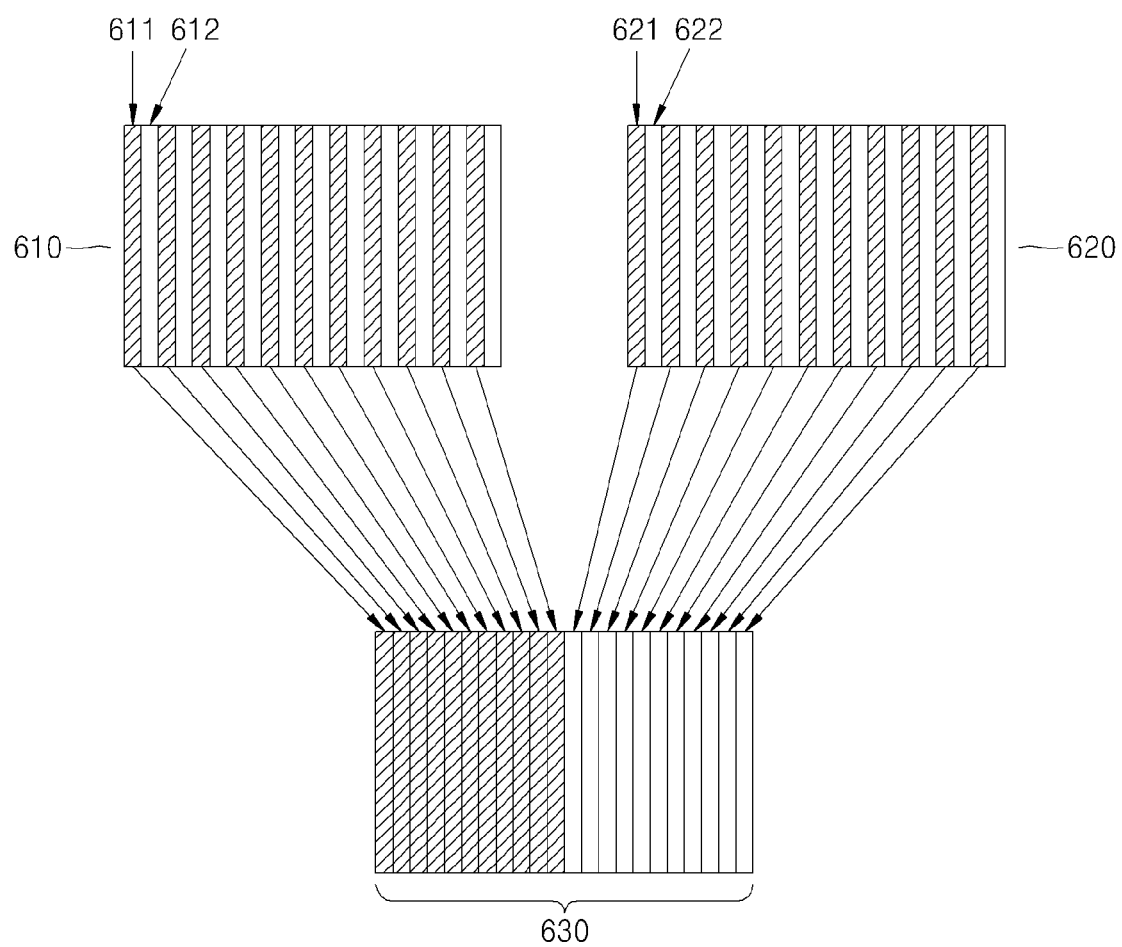
FIG. 6 is a diagram illustrating a process of generating a synthesis image by sampling left-viewpoint image data 610 and right-viewpoint image data 620 according to an exemplary embodiment.

Hereinafter, a process of synthesizing the left viewpoint image data 610 and the right viewpoint image data 620 in a side by side form will be described with reference to FIG. 6. FIG. 6 is a diagram illustrating a process of generating a synthesis image by sampling left-viewpoint image data 610 and right-viewpoint image data 620 according to an exemplary embodiment.

Referring to FIG. 6, only an odd vertical line may be sampled from the left viewpoint image data 610, and only an even vertical line may be sampled from the right viewpoint image data 620 according to the present exemplary embodiment. That is, a first vertical line 611 may be sampled from the left viewpoint image data 610, and a second vertical line 612 may not be sampled. Similarly, a first vertical line 621 may not be sampled from the right viewpoint image data 620, but a second vertical line 622 may be sampled.

Thereafter, the vertical line sampled from the left viewpoint image data 610 may be disposed at the left side of the synthesized picture 630, and the vertical line sampled from the right viewpoint image data 620 may be disposed at the right side of the synthesized picture 630.

A local_layer_prediction_horizontal_size field 461 denotes a horizontal size of an image frame that is reproduced as a 3D image. local_layer_prediction_vertical_size field 462 denotes a vertical size of the image frame that is reproduced as a 3D image.

A local_layer_prediction_horizontal_offset field 463 denotes a horizontal state position of the portion of the picture that is reproduced as the 3D image.

A local_layer_prediction_vertical_offset field 464 denotes a vertical state position of the portion of the picture that is reproduced as the 3D image.

local_layer_display_horizantal_size field 465 denotes a horizontal size of a display where the portion of the picture is reproduced as the 3D image.

local_layer_display_vertical_size field 466 denotes a vertical size of the display where the portion of the picture is reproduced as the 3D image.

The value of the local_layer_display_vertical_size field 466 and the value of the local_layer_prediction_horizontal_size field 461 may be identical.

Figure 5:
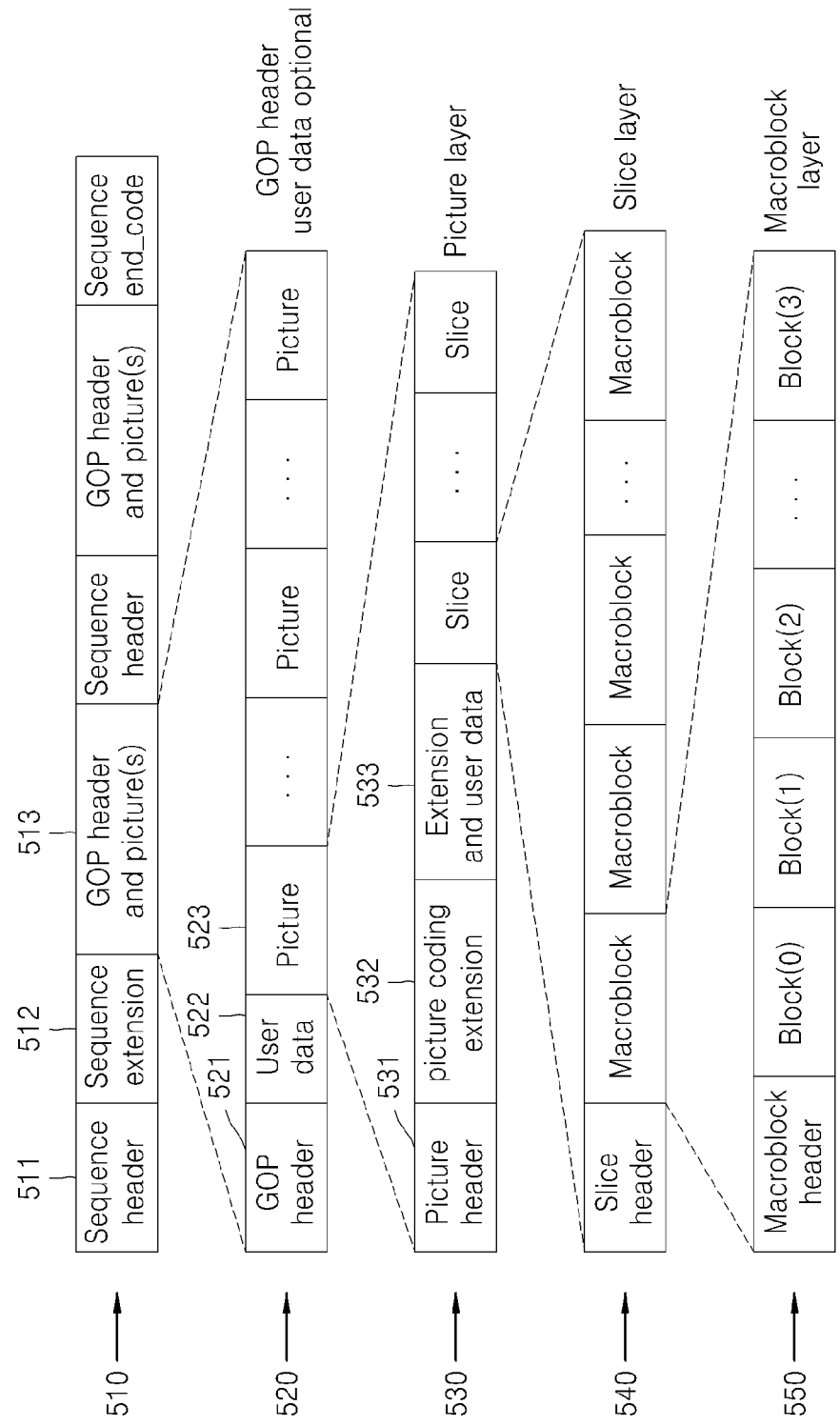
FIG. 5 is a diagram illustrating an exemplary structure of an elementary stream into which three-dimensional detail information is inserted, according to an exemplary embodiment.

FIG. 5 is a diagram illustrating an exemplary structure of an elementary stream into which 3D detail information is inserted, according to an exemplary embodiment.

By way of example, FIG. 5 illustrates a layer structure of an MPEG-2 video, which may include a sequence layer 510, a GOP layer 520, a picture layer 530, a slice layer 540, a macro block layer 550, and a block layer 560.

The sequence layer 510 may include a sequence header 511, a sequence extension 512, and GOP data 513.

The GOP layer 520 may include a GOP header 521, user data 522, and picture data 523.

The picture layer 530 may include a picture header 531, a picture coding extension 532, user data 533, and slice data 534.

The 3D detail information may be included in a certain field of the respective layers. In an exemplary embodiment, the 3D detail information may be included in at least one of the sequence header 511, the user data 522, and the picture coding extension 532. In particular, when the sequence header 511 or the picture coding extension 532 is used, a value (e.g., a reserved value) other than a value that is already defined in an extension start code identifier, i.e., a field indicating a type of data included in an extension field, may be defined, and the value may be set as indicating the 3D detail information (e.g., 0xf).

Figure 7:
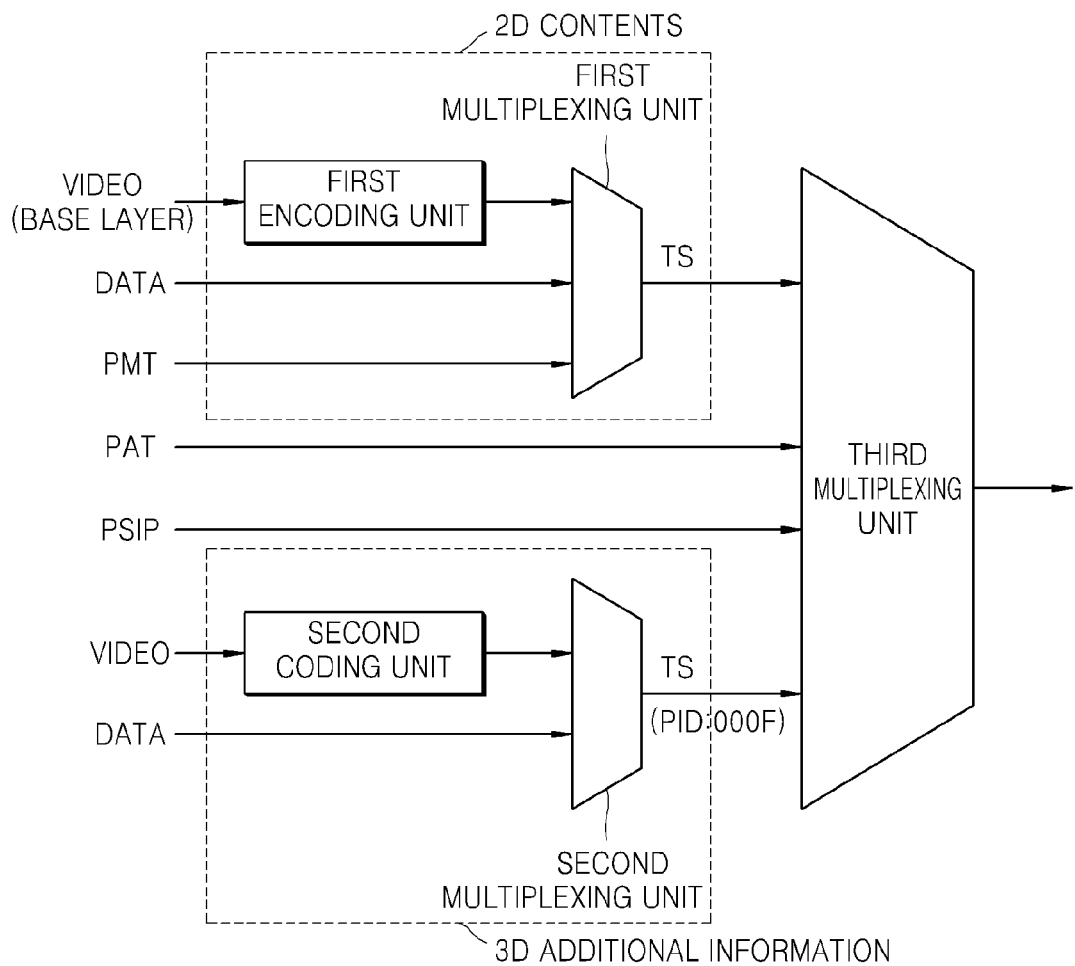
FIG. 7 is a diagram illustrating an exemplary multiplexing process of a transport stream according to an exemplary embodiment.

FIG. 7 is a diagram illustrating an exemplary multiplexing process of a transport stream according to an exemplary embodiment.

Referring to FIG. 7, a first video encoder 712 may encode image data corresponding to a base layer (e.g., a reference viewpoint), and a first multiplexing unit 722 may multiplex the image data corresponding to the base layer and section data such as a PMT.

A second video encoder 714 may encode image data corresponding to an enhancement layer (e.g., an additional viewpoint), and a second multiplexing unit 724 may multiplex the image data corresponding to the enhancement layer and additional information for generating the image data corresponding to the enhancement layer. The additional information for generating the image data corresponding to the enhancement layer may include at least one of disparity and depth information on an elementary image, the image data corresponding to the enhancement layer, 3D content-related information, and a 3D content-related caption.

In this case, a transport stream packet including the additional viewpoint image data or the additional information may have a specific PID (e.g., 000F) to indicate that the transport stream packet provides 3D image data.

In order to multiplex the additional information for generating the additional viewpoint image data together with related art image data (e.g., two-dimensional image data), a buffer model provided in standards in consideration of a compatibility with related art systems may be referenced. To this end, packet timing or a program clock reference (PCR) may be adjusted.

A third multiplexing unit 726 may multiplex PAT, PSIP, the transport stream packet transmitted from the first multiplexing unit 722, and the second multiplexing unit 724.

Thus, compatibility can be maintained, and the 3D image can be provided by assigning a PID of the transport stream packet to a value that a packet may not typically use.

Figure 8:
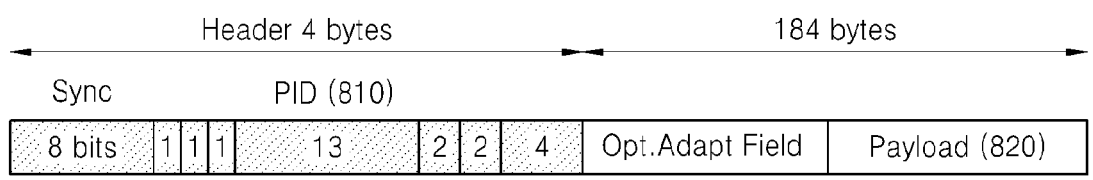
FIG. 8 is a diagram illustrating an exemplary transport stream packet including three-dimensional image data according to an exemplary embodiment.

FIG. 8 is a diagram illustrating an exemplary transport stream packet including 3D image data according to an exemplary embodiment.

Referring to FIG. 8, a PID 801 of the transport stream packet represents the type of data mounted in a payload 802. Accordingly, the processing apparatus 200 can determine whether the payload 802 includes 3D image data, by verifying the PID 801.

Figure 9A:
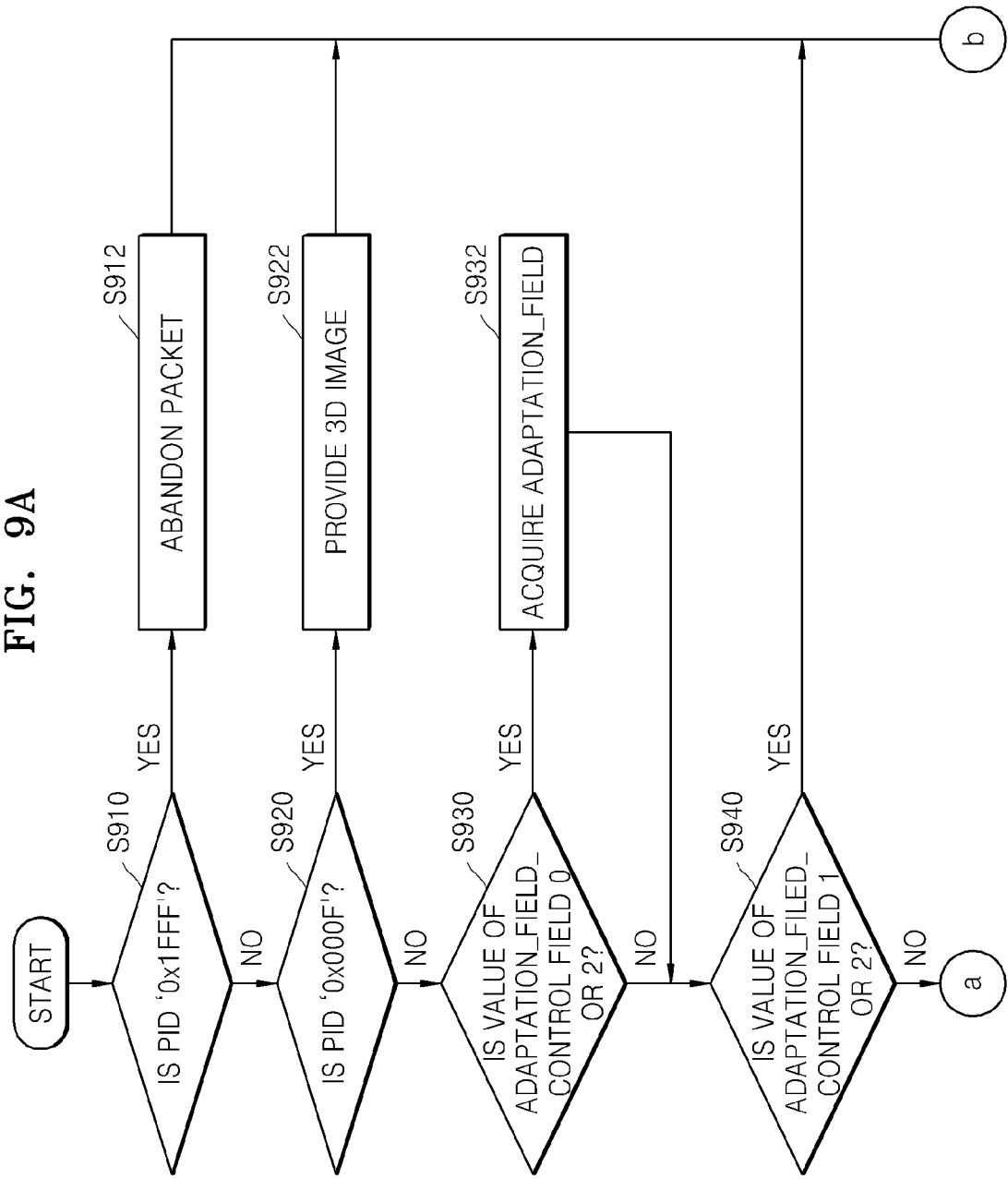
FIGS. 9A and 9B are flowcharts illustrating a process of processing a transport stream package according to an exemplary embodiment.
Figure 9B:
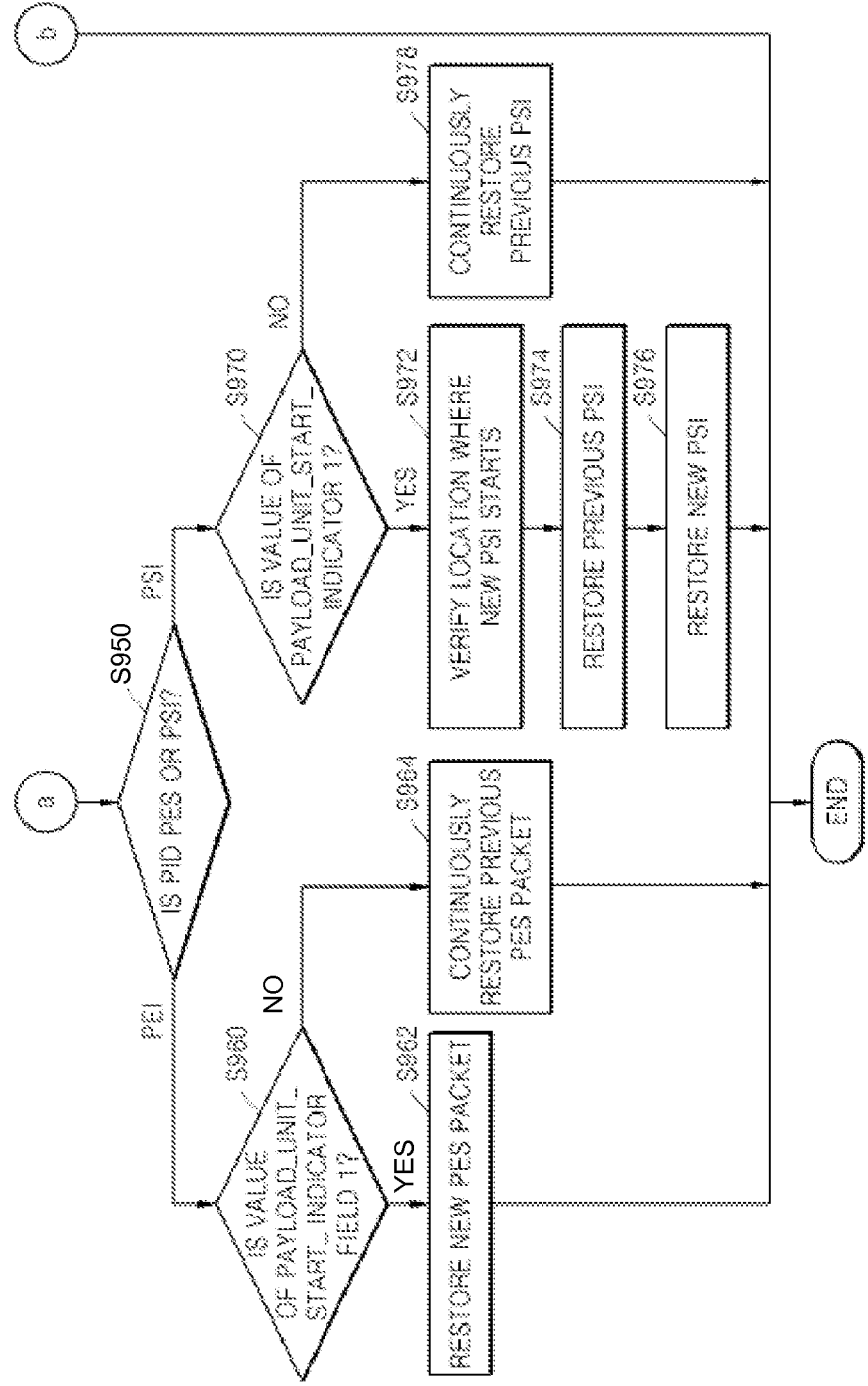

FIGS. 9A and 9B are flowcharts illustrating a process of processing a transport stream package according to an exemplary embodiment.

Referring to FIGS. 9A and 9B, in operation S910, it is determined whether a PID of a packet is 0x1FFF. If it is determined that the PID of the packet is 0x1FFF, operation S912 may be performed to abandon the corresponding packet.

In operation S920, it is determined whether the PID of the packet is 0x000F. If the PID of the packet is 0x000F, it will be assumed that the corresponding packet includes 3D data according to an exemplary embodiment. Accordingly, if it is determined that the PID of the packet is 0x000F, the process may proceed to operation S922 to provide the 3D image. Otherwise, the process may proceed to operation S930 to provide a two-dimensional image.

In operation S930, it is determined whether the value of Adaptation_field_control field is 0 or 2. If it is determined that the value of the Adaptation_field_control field is 0 or 2, the corresponding packet has an Adaptation_field. Accordingly, operation S932 may be performed to acquire the Adaptation_field.

In operation S940, it is determined whether the value of the Adaptation_field_control field is 1 or 2. If it is determined that the value of the Adaptation_field_control field is 1 or 2, the corresponding packet has a payload. Accordingly, a process for extracting the payload may be performed.

In operation S950, it is determined whether the PID of the packet represents PES or PSI. If it is determined that the PID of the packet represents PES, operation S960 may be performed. If it is determined that the PID of the packet represents PSI, operation S970 may be performed.

In operation S960, it is determined whether the value of a payload_unit_start_indicator field is 1. A value of the corresponding field being set to 1 may indicate that a new PES packet exists. If it is determined that the payload_unit_start_indicator field is 1, operation S962 may be performed. In operation S962, the new PES packet may be restored using data included in the payload. On the other hand, if it is determined that the value of the payload_unit_start_indicator field is 0, operation S964 may be performed. In operation S964, a previous PES packet may be continuously restored using the data included in the payload.

In operation S970, it is determined whether a payload_unit_start_indicator field is 1. If it is determined that the payload_unit_start_indicator field is 1, operation S972 may be performed. In operation S972, a location where a new PSI starts in the payload may be verified through a pointer_field field. In operation S974, a previous PSI may be restored using data before the location where the new PSI starts, and a new PSI may be restored using data after the location where the new PSI starts. If it is determined that the value of the payload_unit_start_indicator field is not 1, operation S978 may be performed. In operation S978, the previous PSI may be continuously restored using the data included in the payload.

Figure 10:
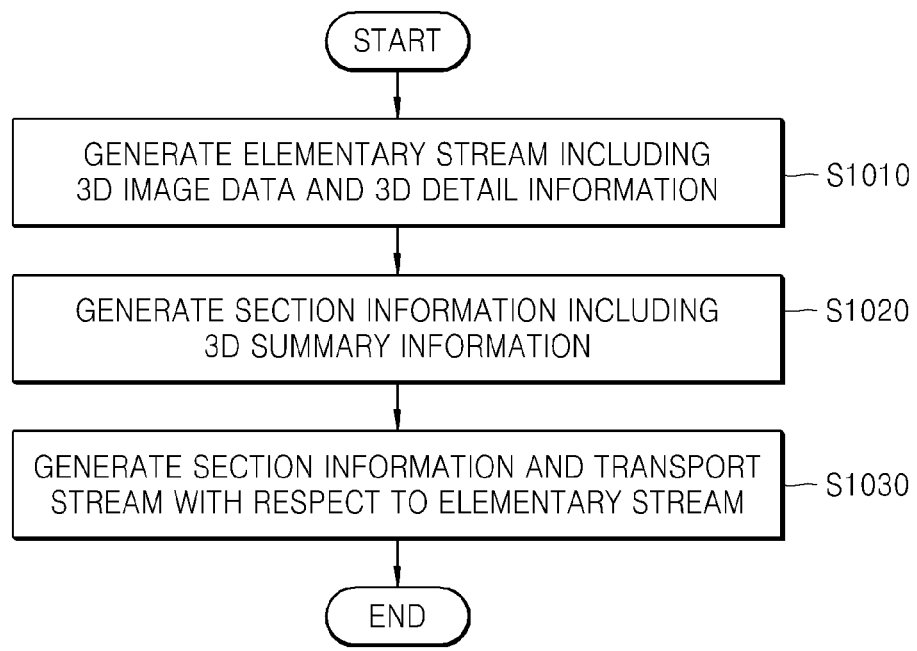
FIG. 10 is a flowchart illustrating a stream generation method according to an exemplary embodiment.

FIG. 10 is a flowchart illustrating a stream generation method according to an exemplary embodiment; and Referring to FIG. 10, in operation S1010, an elementary stream including 3D image data and 3D detail information used to reproduce the 3D image data providing a 3D image may be generated.

In operation S1020, at least one section including 3D summary information representing that a transport stream to be generated through the elementary stream provides the 3D image may be generated.

In operation S1030, the transport stream with respect to the elementary stream and the at least one section may be generated.

Figure 11:
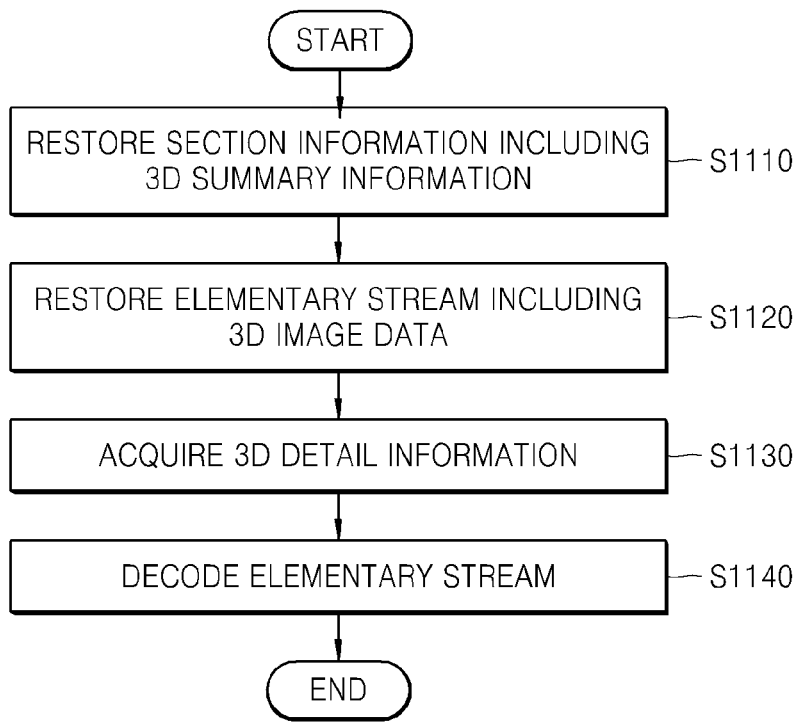
FIG. 11 is a flowchart illustrating a stream processing method according to an exemplary embodiment.

FIG. 11 is a flowchart illustrating a stream processing method according to an exemplary embodiment.

Referring to FIG. 11, in operation S1110, at least one section including summary information on 3D image data may be restored from a first transport stream. The summary information may include whether a second transport stream including the 3D image data exists, and identification information on the second transport stream.

In operation S1120, at least one elementary stream including the 3D image data may be restored from the second transport stream base on the summary information.

In operation S1130, 3D detail information used to reproduce the 3D image may be acquired from a certain region of the at least one elementary stream. The 3D detail information may include at least one of mode information representing a structure of the 3D image data, merged information in which a plurality of image data is merged, and sampling mode information used in generating the merged image.

In operation S1140, the elementary stream may be decoded based on the 3D detail information.

While not restricted thereto, one or more of the above-described exemplary embodiments may be implemented in a program that is executable in a computer, and may be implemented in a general-purpose digital computer that operates the program.

The computer-readable recording media may include storage media such as magnetic storage media (e.g., ROM, floppy disk, hard disk, and the like), optical reading media (e.g., CDROM, DVD), etc. Furthermore, an exemplary embodiment may be written as a computer program transmitted over a computer-readable transmission medium, such as a carrier wave, and received and implemented in general-use or special-purpose digital computers that execute the programs. Moreover, one or more units of the stream generation apparatus 100 and the stream processing apparatus 200 can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of generating a stream, the method comprising:
   generating a first elementary stream comprising left-viewpoint image data of an image encoded by a first video encoder;
   generating a second elementary stream comprising right-viewpoint image data of the image encoded by a second video encoder that is different from the first video encoder;
   generating a program map table (PMT) comprising three-dimensional (3D) summary information representing that a transport stream to be generated from the first elementary stream and the second elementary stream provides a 3D image; and
   generating the transport stream with respect to the PMT and the first elementary stream and the second elementary stream,
   wherein the generating the transport stream comprises generating a first transport packet including the PMT and one of the first elementary stream and the second elementary stream, generating a second transport packet including the other one of the first elementary stream and the second elementary stream, and combining the first transport packet and the second transport packet.

2. The method of claim 1, further comprising generating 3D detail information for reproducing the 3D image data, wherein the 3D detail information is comprised in a field of at least one of a sequence layer, a group of pictures (GOP) layer, and a picture layer in the first elementary stream and the second elementary stream.

3. The method of claim 2, wherein the 3D detail information comprises at least one of 3D mode information representing a configuration of the 3D image data and viewpoint information representing a viewpoint of the 3D image data.

4. The method of claim 3, wherein the 3D detail information further comprises output order information representing an output order between right-viewpoint image data and left-viewpoint image data providing the 3D image.

5. The method of claim 3, wherein the 3D detail information further comprises at least one of sampling information and synthesis mode information between right-viewpoint image data and left-viewpoint image data providing the 3D image.

6. The method of claim 3, wherein the 3D detail information further comprises 3D section information on a section where the 3D image is provided in an image sequence.

7. The method of claim 1, wherein the generating the PMT comprises inserting the 3D summary information into information on a plurality of image data of different layers provided through the first elementary stream and the second elementary stream.

8. The method of claim 7, wherein the plurality of image data of different layers are encoded by at least one of a scalability video coding (SVC) codec and a multi-view video coding (MVC) codec.

9. The method of claim 7, wherein the 3D summary information comprises 3D mode information on a configuration of the 3D image data.

10. The method of claim 1, wherein the generating the PMT comprises inserting the 3D summary information into an unused, reserved field of descriptor data.

11. The method of claim 1, wherein the 3D summary information is a packet identifier (PID) of the transport stream that provides the 3D image.

12. A non-transitory computer readable recording medium comprising a program for implementing the method of claim 1.

13. A method of processing a packet, the method comprising:
   restoring a program map table (PMT) comprising three-dimensional (3D) summary information on 3D image data from a transport stream;
   restoring a first elementary stream providing left-viewpoint image data of an image and a second elementary stream comprising right-viewpoint image data of the image from the transport stream, based on the 3D summary information;
   decoding data of the first elementary stream by a first video decoder and acquiring the left-viewpoint image data; and
   decoding data of the second elementary stream by a second video decoder that is different from the first video decoder and acquiring the right-viewpoint image data,
   wherein the transport stream comprises a first transport packet including the PMT and one of the first elementary stream and the second elementary stream and a second transport packet including the other one of the first elementary stream.

14. The method of claim 13, further comprising acquiring 3D detail information for reproducing the 3D image data, wherein the 3D detail information is acquired from a field of at least one of a sequence layer, a group of pictures (GOP) layer, and a picture layer in the first elementary stream and the second elementary stream.

15. The method of claim 14, wherein the 3D detail information comprises at least one of 3D mode information representing a configuration of the 3D image data and viewpoint information representing a viewpoint of the 3D image data.

16. The method of claim 15, wherein the 3D detail information further comprises output order information representing an output order between right-viewpoint image data and left-viewpoint image data providing the 3D image.

17. The method of claim 15, wherein the 3D detail information further comprises at least one of sampling information and multiplexing mode information between right-viewpoint image data and left-viewpoint image data providing the 3D image.

18. The method of claim 15, wherein the 3D detail information further comprises 3D section information on a section where the 3D image is provided in an image sequence.

19. The method of claim 14, wherein the acquiring of the 3D detail information comprises acquiring the 3D summary information from information on a plurality of image data of different layers that are provided through the elementary stream.

20. The method of claim 19, wherein the plurality of image data of different layers are encoded by at least one of a scalability video coding (SVC) codec and a multi-view video coding (MVC) codec.

21. The method of claim 19, wherein the 3D summary information further comprises 3D mode information on a configuration of the 3D image data.

22. The method of claim 13, wherein the 3D summary information represents whether the second transport stream comprises the 3D image data.

23. A non-transitory computer readable recording medium comprising a program for implementing the method of claim 13.

24. An apparatus for generating a stream, the apparatus comprising:

an elementary stream generation unit which generates a first elementary stream comprising left-viewpoint image data of an image encoded by a first video encoder and generates a second elementary stream comprising right-viewpoint image data of the image encoded by a second video encoder that is different from the first video encoder;

a program map table (PMT) generation unit which generates a PMT comprising three-dimensional (3D) summary information representing that a transport stream to be generated from the first elementary stream and the second elementary stream provides the 3D image; and a transport stream generation unit which generates the transport stream with respect to the PMT and the first elementary stream and the second elementary stream, wherein the transport generation unit generates a first transport packet including the PMT and one of the first elementary stream and the second elementary stream, generates a second transport packet including the other one of the first elementary stream and the second elementary stream, and combines the first transport packet and the second transport packet.

25. An apparatus for processing a stream, the apparatus comprising:

a section restoring unit which restores a program map table (PMT) comprising three-dimensional (3D) summary information on 3D image data from a transport stream;

an elementary stream restoring unit which restores a first elementary stream providing left-viewpoint data of an image and a second elementary stream comprising right-viewpoint image data of the image from the transport stream, based on the 3D summary information; and a decoding unit which decodes data of the first elementary stream by a first video decoder and acquiring the left-viewpoint image data and decodes data of the second elementary stream by a second video decoder that is different from the first video decoder and acquiring the right-viewpoint image data, wherein the transport stream comprises a first transport packet including the PMT and one of the first elementary stream and the second elementary stream and a second transport packet including the other one of the first elementary stream.

* * * * *